United States Patent
Liu

(10) Patent No.: US 10,473,467 B2
(45) Date of Patent: Nov. 12, 2019

(54) METHOD FOR DETERMINING AT WHICH LEVEL A VEHICLE IS WHEN THE VEHICLE IS IN A MULTI-LEVEL ROAD SYSTEM

(71) Applicant: Mitac International Corp., Taoyuan (TW)

(72) Inventor: Neng Liu, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 81 days.

(21) Appl. No.: 15/593,919

(22) Filed: May 12, 2017

(65) Prior Publication Data

US 2017/0336209 A1 Nov. 23, 2017

(30) Foreign Application Priority Data

May 17, 2016 (TW) .............................. 105115140 A

(51) Int. Cl.
| | |
|---|---|
| G01C 21/20 | (2006.01) |
| G01C 21/30 | (2006.01) |
| G06K 9/00 | (2006.01) |
| G06T 7/00 | (2017.01) |
| G01C 21/26 | (2006.01) |
| G06T 7/73 | (2017.01) |
| G01S 5/16 | (2006.01) |

(52) U.S. Cl.
CPC .............. *G01C 21/20* (2013.01); *G01C 21/26* (2013.01); *G01C 21/30* (2013.01); *G01S 5/16* (2013.01); *G06K 9/00791* (2013.01); *G06T 7/74* (2017.01); *G06T 7/97* (2017.01); *G06T 2207/30252* (2013.01)

(58) Field of Classification Search
CPC ........ G01C 21/20; G01C 21/26; G01C 21/30; G01S 5/16; G06T 7/74; G06T 7/97; G06T 2207/30252; G06K 9/00791
See application file for complete search history.

(56) References Cited

U.S. PATENT DOCUMENTS

| | | | | |
|---|---|---|---|---|
| 2009/0299857 | A1* | 12/2009 | Brubaker | G06Q 30/02 705/14.66 |
| 2016/0102992 | A1* | 4/2016 | Otero Diaz | G01C 21/3667 701/532 |
| 2017/0008521 | A1* | 1/2017 | Braunstein | G01C 21/32 |
| 2018/0188044 | A1* | 7/2018 | Wheeler | G01C 21/32 |

FOREIGN PATENT DOCUMENTS

CN 103935293 A 7/2014

* cited by examiner

*Primary Examiner* — Nga X Nguyen
(74) *Attorney, Agent, or Firm* — MLO, a professional corp.

(57) ABSTRACT

A method for determining which level a vehicle is at when the vehicle is on a multi-level road system is to be implemented by a vehicle auxiliary system that includes a vehicle equipment unit and a server unit. The method includes the steps of: obtaining visual media data of surroundings of the vehicle generated by an image capturing module of the vehicle equipment unit; receiving reference data associated with surroundings of a vehicle in the multi-level road system from the server unit; and generating a recognition result indicating at which level the vehicle is by performing an image-matching technique on the visual media data and the reference data.

7 Claims, 5 Drawing Sheets

METHOD FOR DETERMINING AT WHICH LEVEL A VEHICLE IS WHEN THE VEHICLE IS IN A MULTI-LEVEL ROAD SYSTEM

CROSS-REFERENCE TO RELATED APPLICATION

This application claims priority of Taiwanese Patent Application No. 105115140, filed on May 17, 2016.

FIELD

The disclosure relates to a method for determining which level a vehicle is at when the vehicle is on a multi-level road system, and more particularly to a method for determining which level a vehicle is at when the vehicle is in a multi-level road system by performing an image-matching technique.

BACKGROUND

A conventional vehicle auxiliary system, such as a car video recorder, provided with Global Positioning System (GPS) functionality is incapable of correctly determining at which level a vehicle is when the vehicle is driving on a multi-level road system that includes at least two different levels of roads. For example, when the vehicle is driving on an elevated road which is on a higher level of the multi-level road system, the conventional vehicle auxiliary system may mistakenly provide driving assistance information that corresponds to a ground level road on a lower level of the multi-level road system.

SUMMARY

Therefore, an object of the disclosure is to provide a method for determining at which level a vehicle is when the vehicle is in a multi-level road system with at least two different levels of roads.

According to the disclosure, the method is to be implemented by a vehicle auxiliary system. The vehicle auxiliary system includes a vehicle equipment unit disposed on the vehicle, and a server unit. The vehicle equipment unit includes an image capturing module and a processing module. The image capturing module is configured to capture at least one image of surroundings of the vehicle to generate visual media data. The method includes the steps of: a) obtaining, by the processing module, the visual media data generated by the image capturing module; b) receiving, by the processing module, reference data that is associated with surroundings of a vehicle on the multi-level road system from the server unit; and c) generating, by the processing module, a recognition result that indicates which level the vehicle is at by performing an image-matching technique on the visual media data and the reference data.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
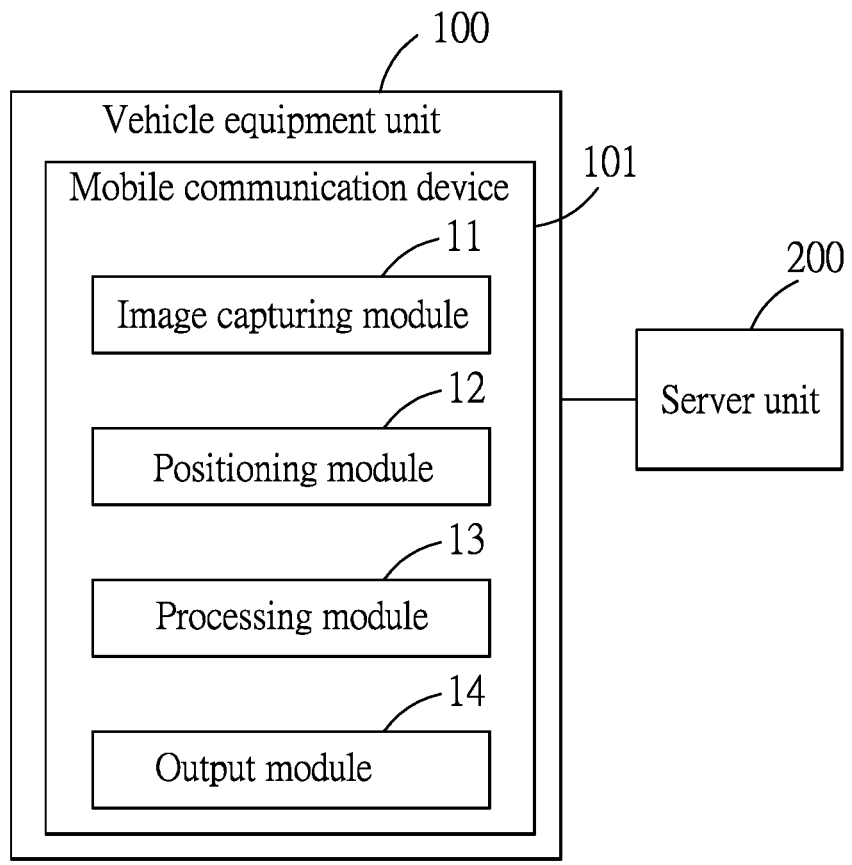
FIG. 1 is a block diagram illustrating a first embodiment of a vehicle auxiliary system which implements a method for determining at which level a vehicle is when the vehicle is on a multi-level road system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
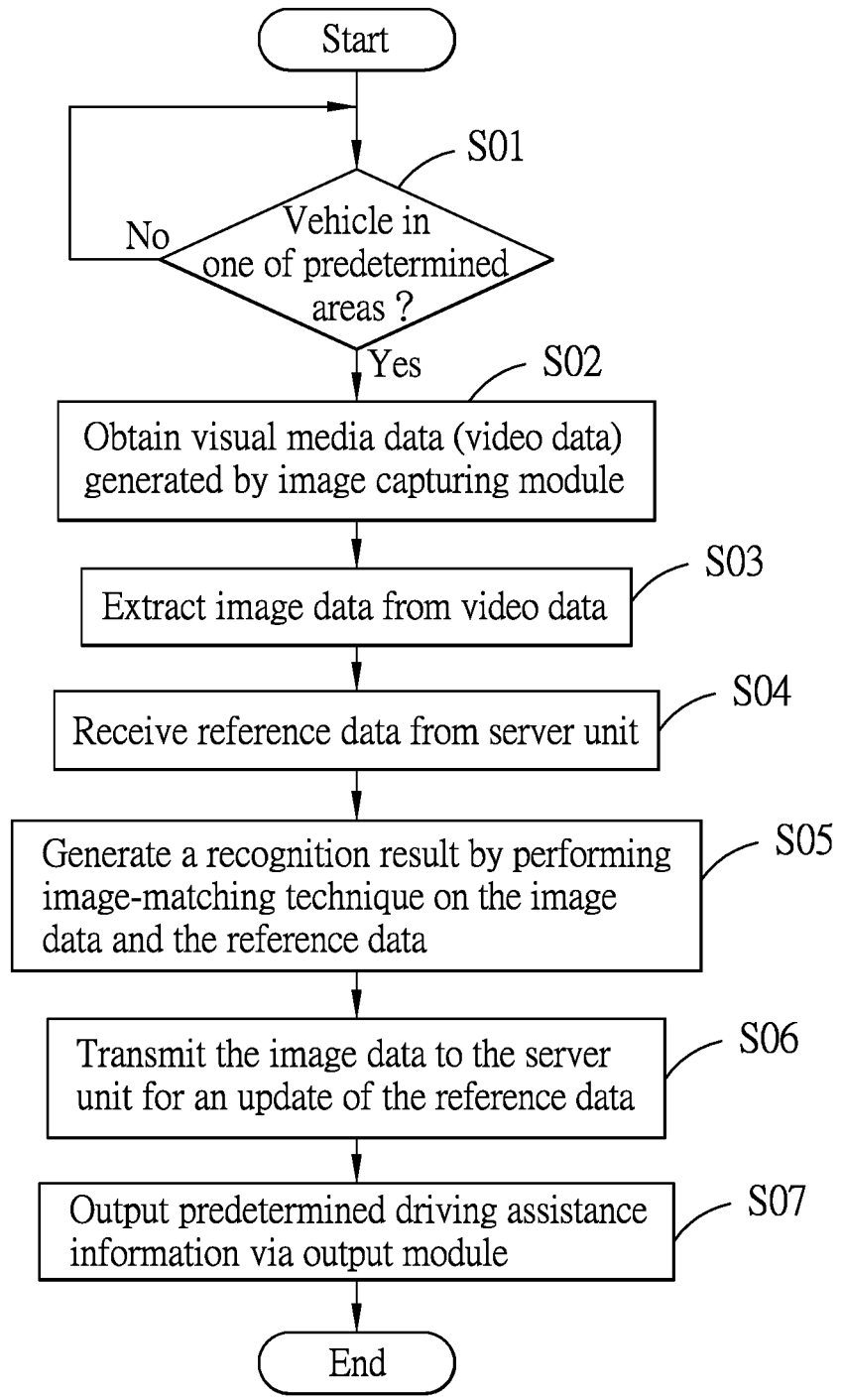
FIG. 2 is a flow chart illustrating an embodiment of the method for determining at which level a vehicle is when the vehicle is on a multi-level road system.

FIGS. 1 and 2 illustrate an embodiment of a method for determining at which level a vehicle (not shown) is when the vehicle is in a multi-level road system (either driving or stopping) according to the disclosure, and a first embodiment of a vehicle auxiliary system which implements the method. The multi-level road system includes roads on at least two different levels. For example, the multi-level road system may include an elevated road on a higher level of the multi-level road system and a ground level road (hereinafter referred as to normal road) on a lower level thereof. The vehicle auxiliary system includes a vehicle equipment unit 100 disposed on the vehicle, and a server unit 200 communicably coupled with the vehicle equipment unit 100. The vehicle equipment unit 100 includes an image capturing module 11, a positioning module 12, a processing module 13 and an output module 14. The image capturing module 11 is configured to capture at least one image of surroundings of the vehicle to generate visual media data. The positioning module 12 may be exemplified by a Global Positioning System (GPS) receiver, and is configured to detect a current position of the vehicle based on a GPS signal. In this embodiment, the vehicle equipment unit 100 includes a mobile communication device 101 such as a smartphone. The mobile communication device 101 includes the aforementioned image capturing module 11, the positioning module 12, the processing module 13 and the output module 14. The image capturing module 11 may be exemplified by a digital camera or a digital video recorder, the processing module 13 may be exemplified by a central processing unit (CPU), a processor or a system on a chip (SoC), and the output module 14 may be exemplified as a display or a sound speaker. The method comprises the following steps S01-S07.

In step S01, the processing module 13 determines whether the vehicle is in one of a plurality of predetermined areas based on the current position detected by the positioning module 12, and performs step S02 when it is determined that the vehicle is in one of the predetermined areas. Otherwise, step S01 is repeated until the vehicle is determined to be in one of the predetermined areas. Each of the predetermined areas may be an area near the multi-level road system, such as an area where an elevated road crosses over a normal road, or an area where the elevated road and the normal road extend adjacent to each other in parallel. Therefore, for example, according to the current position detected by the positioning module 12, the processing module 13 is able to determine whether the vehicle is in one of a plurality of predetermined areas for determining whether the vehicle is at area where the elevated road crosses over the road, or where the elevated road and the road extend adjacent to each other in parallel.

In step S02, the processing module 13 obtains the visual media data generated by the image capturing module 11. In this embodiment, the visual media data is video data.

In step S03, the processing module 13 extracts image data from the video data.

Figure 3:
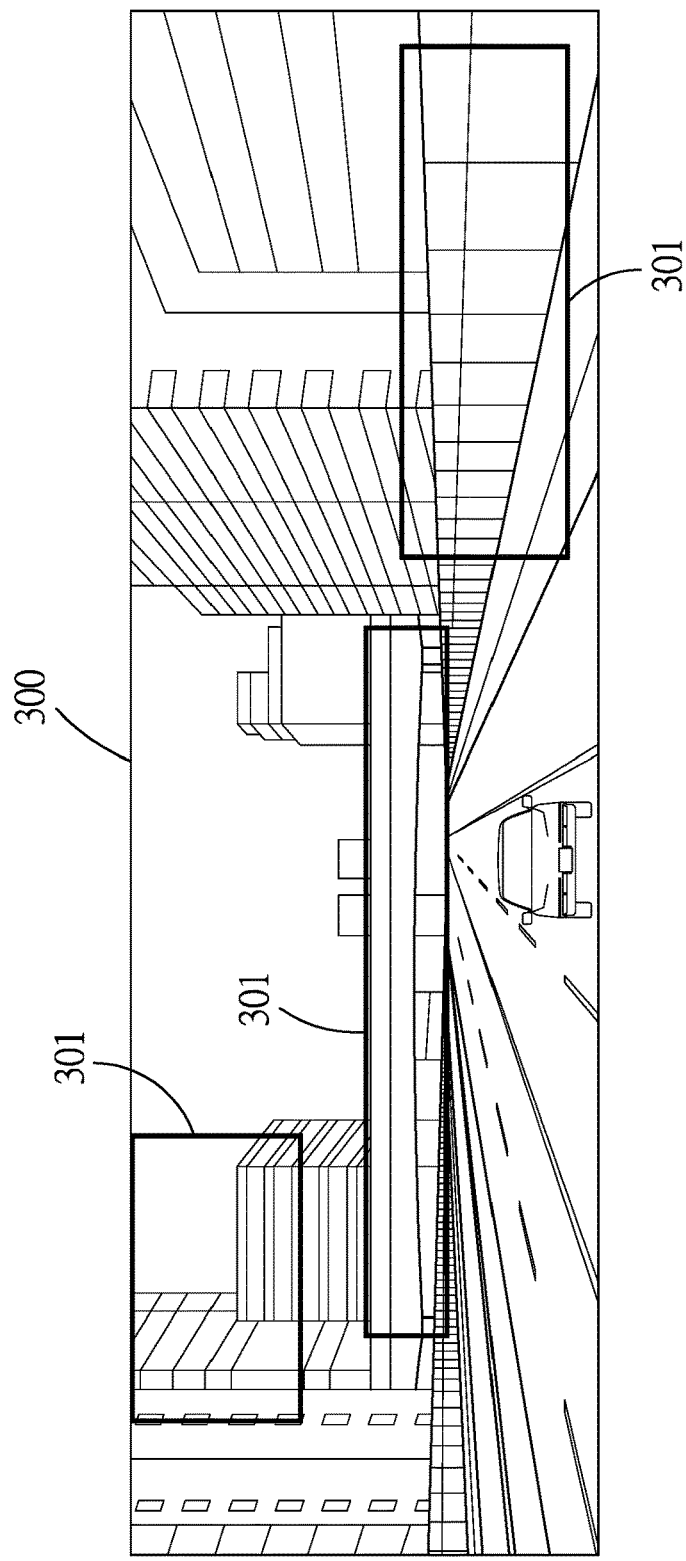
FIG. 3 is a schematic diagram illustrating an embodiment of a first reference image of the surroundings of a vehicle which is on an elevated road at a higher level of the multi-level road system.
Figure 4:
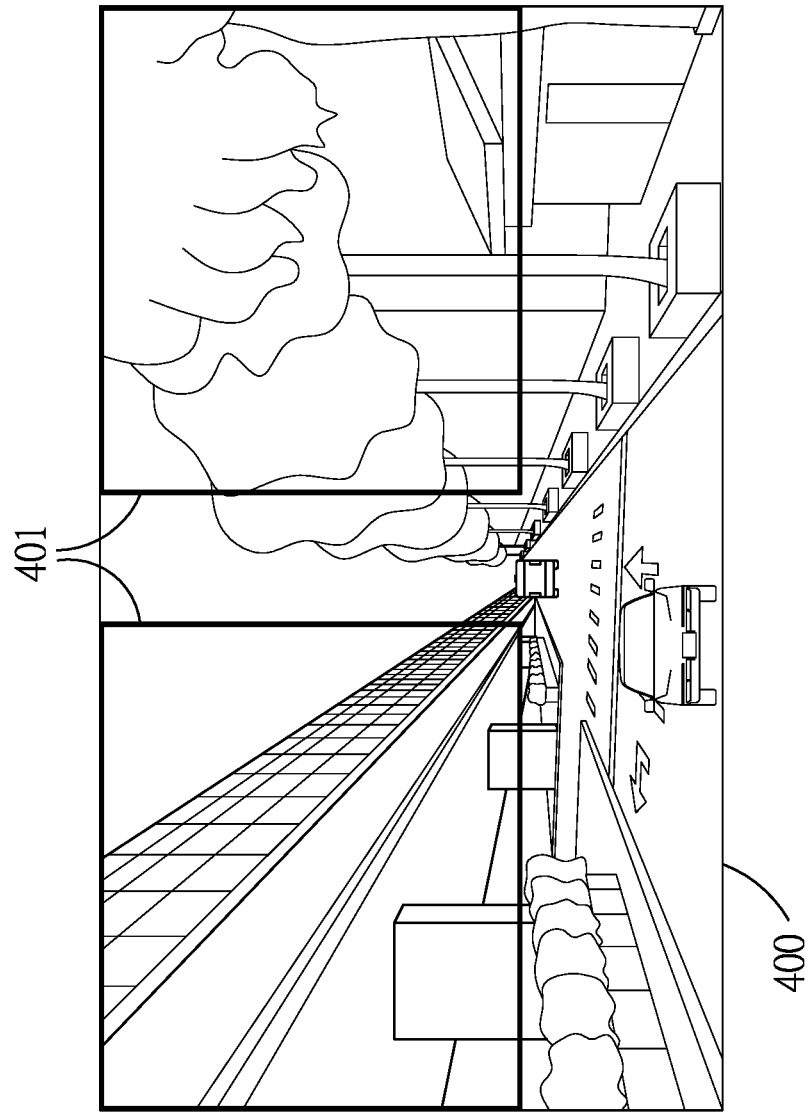
FIG. 4 is a schematic diagram illustrating an embodiment of a second reference image of the surroundings of a vehicle which is on a ground level road at a lower level of the multi-level road system.

In step S04, the processing module 13 receives reference data that is associated with the surroundings of the vehicle from the server unit 200. The reference data is stored in the server unit 200, and contains a first reference image 300 relevant to the elevated road (as shown in FIG. 3), and a second reference image 400 relevant to the normal road (as shown in FIG. 4). Specifically speaking, the first reference image 300 may be an image of the surroundings of a vehicle which is at one of the levels (e.g., on an elevated road at the higher level as shown in FIG. 3) of the multi-level road system, and the second reference image 400 may be an image of the surroundings of a vehicle which is at another one of the levels (e.g., on a normal road at the lower level as shown in FIG. 4) of the multi-level road system. The first reference image 300 includes a plurality of first features 301 for recognition, e.g., noise barriers, a bridge and buildings as depicted in FIG. 3. The second reference image 400 includes a plurality of second features 401 for recognition, e.g., street trees and an elevated road as depicted in FIG. 4. The first features 301 and the second features 401 may serve as templates in a template matching technique. Specifically speaking, the processing module 13 transmits the current position detected by the positioning module 12 via a communication interface (not shown) to the server unit 200, and the server unit 200 responds by transmitting the first reference image 300 and the second reference image 400 that correspond to the current position to the processing module 13 accordingly.

In step S05, the processing module 13 generates a recognition result that indicates which level the vehicle is at by image-matching on the image data and the reference data. Specifically speaking, the processing module 13 generates the recognition result that indicates which level the vehicle is at by performing image comparisons between the image data and the first reference image 300 based on the first features 301, and between the image data and the second reference image 400 based on the second features 401. For example, when the processing module 13 determines that the image data includes features matching the first features 301, the processing module 13 generates the recognition result indicating that the vehicle is currently on the elevated road. Similarly, when the processing module 13 determines that the image data includes features matching the second features 401, the processing module 13 generates the recognition result indicating that the vehicle is currently on the normal road.

In step S06, the processing module 13 transmits, via the communication interface, the image data to the server unit 200 for an update of the reference data. Therefore, the server unit 200 can use the latest image data from the processing module 13 as reference data.

In step S07, the processing module 13 controls the output module 14 to output predetermined driving assistance information that corresponds to the level at which the vehicle is located in the multi-level road system. For example, according to the recognition result, the processing module 13 of the vehicle equipment unit 100 controls the output module 14, e.g., a display or a sound speaker, to provide the predetermined driving assistance information of the elevated road or the normal road which corresponds to the recognition result. The driving assistance information may be information associated with GPS navigation or locations of speed cameras. It should be noted that applications of the recognition result are not limited to the above-mentioned disclosure. In some other embodiments, the recognition result is merely used as a reference for recording paths that have been taken.

It should be noted that step S03 may be omitted in some embodiments, where the visual media data would be directly compared with the reference data for generation of the recognition result, and be directly transmitted to the server unit 200 for an update of the reference data.

Figure 5:
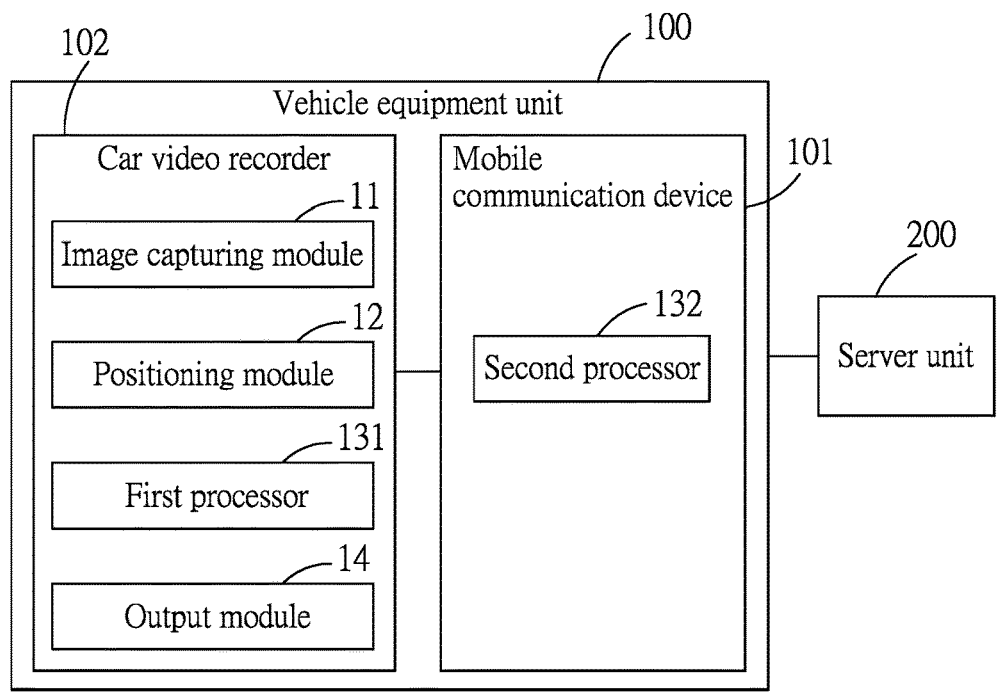
FIG. 5 is a block diagram illustrating a second embodiment of the vehicle auxiliary system implementing the method according to the disclosure.

Referring to FIG. 5, a second embodiment of the vehicle auxiliary system which implements the method according to the disclosure is illustrated. The second embodiment of the vehicle auxiliary system is similar to the first embodiment of the vehicle auxiliary system but with the following differences. In the second embodiment, the vehicle equipment unit 100 includes a car video recorder 102 and a mobile communication device 101. The car video recorder 102 includes the image capturing module 11, the positioning module 12, the output module 14 and a first processor 131. The mobile communication device 101 includes a second processor 132. The first and second processors 131, 132 cooperatively serve as the processing module 13 in the first embodiment. Steps S01 and S02 are to be performed by the first processor 131. Subsequent to step S02, the first processor 131 of the car video recorder 102 transmits the video data to the second processor 132 of the mobile communication device 101. Steps S03, S04, S05 and S06 are performed by the second processor 132. Subsequent to step S05, the second processor 132 of the mobile communication device 101 transmits the recognition result to the first processor 131 of the car video recorder 102, and step S07 is performed by the first processor 131 of the car video recorder 102. It should be noted that, in other embodiments, the second processor 132 can control another output module (not shown) of the mobile communication device 101, to output the predetermined driving assistance information according to the recognition result. The output module of the mobile communication device 101 can be a display unit or a speaker.

Figure 6:
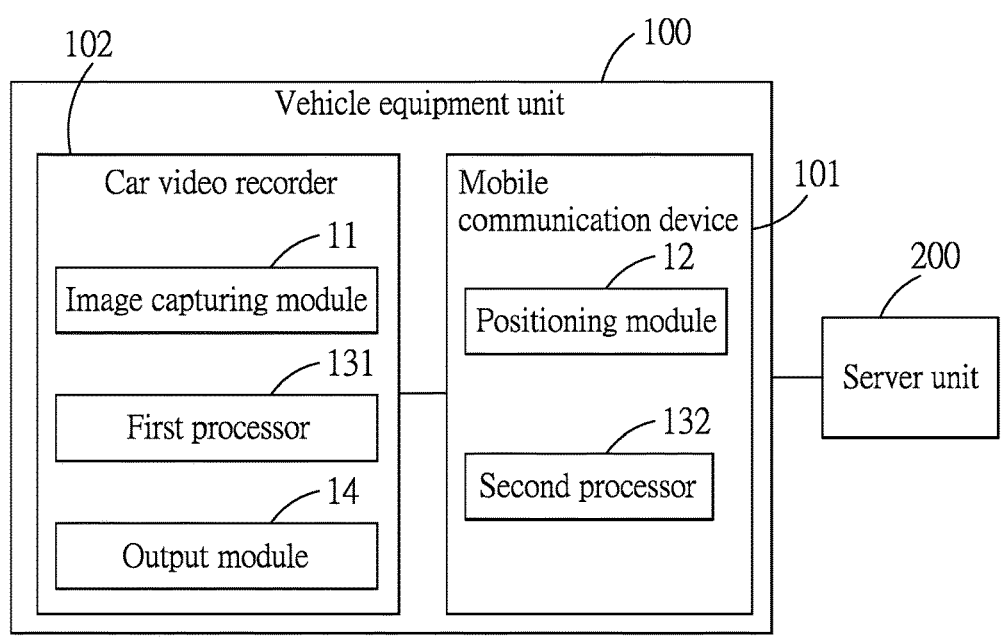
FIG. 6 is a block diagram illustrating a third embodiment of the vehicle auxiliary system implementing the method according to the disclosure.

Referring to FIG. 6, a third embodiment of a vehicle auxiliary system which implements the method according to the disclosure is illustrated. The third embodiment of the vehicle auxiliary system is similar to the first embodiment of the vehicle auxiliary system but with the following differences. In the third embodiment, the vehicle equipment unit 100 includes a car video recorder 102 and a mobile communication device 101. The car video recorder 102 includes the image capturing module 11, the output module 14 and a first processor 131. The mobile communication device 101 includes the positioning module 12 and a second processor 132. The first and second processors 131, 132 cooperatively serve as the processing module 13 of the first embodiment. Steps S01, S03, S04, S05 and S06 are to be performed by the second processor 132 of the mobile communication device 101. Subsequent to step S01, the second processor 132 notifies the first processor 131 to perform step S02 when it is determined that the vehicle is in one of the predetermined areas. Subsequent to step S02, the first processor 131 transmits the video data generated by the image capturing module 11 to the second processor 132 of the mobile communication device 101. Subsequent to step S5, the second processor 132 of the mobile communication device 101 transmits the recognition result to the first processor 131 of the car video recorder 102, for enabling the first processor 131 of the car video recorder 102 to perform step S07. In other embodiments, the second processor 132 can control another output module (not shown) of the mobile communication device 101 to output the predetermined driving assistance information according to the recognition result. The output module of the mobile communication device 101 can be a display unit or a speaker.

It is worth noting that in other embodiments, the vehicle equipment unit 100 may transmit the visual media data to the server unit 200. The server unit 200 performs the image-matching technique on the visual media data and the reference data so as to generate the recognition result, and transmits the recognition result to the vehicle equipment unit 100.

In summary, the method for determining which level a vehicle is at when the vehicle is on a multi-level road system according to the disclosure is to be implemented by the vehicle auxiliary system. The processing module 13 performs the image-matching technique on the visual media data generated by the image capturing module 11 and on the reference data received from the server unit 200 so as to generate the recognition result that indicates at which level the vehicle drives on. Consequently, the vehicle auxiliary system is capable of correctly providing the predetermined driving assistance information accordingly. Moreover, after generating the recognition result, the processing module 13 transmits the visual media data to the server unit 200 for an update of the reference data.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for determining which level a vehicle is at when the vehicle is in a multi-level road system that includes roads on at least two different levels, the method to be implemented by a vehicle auxiliary system that includes a vehicle equipment unit disposed on the vehicle, and a server unit, the vehicle equipment unit including a positioning module, an image capturing module and a processing module, the positioning module configured to detect a current position of the vehicle, the image capturing module configured to capture at least one image of surroundings of the vehicle to generate visual media data, the method comprising the steps of:
    a) determining, by the processing module, whether the vehicle is in a predetermined area based on the current position detected by the positioning module, wherein the predetermined area is one of an area where an elevated road crosses over a ground level road and an area where the elevated road and the ground level road extend adjacent to each other in parallel;
    b) obtaining, by the processing module when it is determined that the vehicle is in the predetermined area based on the current position detected by the positioning module, the visual media data generated by the image capturing module;
    c) receiving, by the processing module, reference data that is associated with surroundings of the vehicle in the multi-level road system from the server unit and that includes a first feature relevant to the elevated road and a second feature relevant to the ground level road; and
    d) generating, by the processing module, a recognition result that indicates which level of the multi-level road system the vehicle is at by performing an image-matching technique on the visual media data and the reference data, wherein the recognition result indicates that the vehicle is currently on the elevated road when it is determined that the visual media data includes a feature matching the first feature included in the reference data, and indicates that the vehicle is currently on the ground level road when it is determined that the visual media data includes a feature matching the second feature included in the reference data.

2. The method as claimed in claim 1, further comprising, subsequent to step d), the step of:
    e) transmitting, by the processing module, the visual media data to the server unit for an update of the reference data.

3. The method as claimed in claim 2, wherein
    in step b), the visual media data is video data; and
    in step c), the reference data contains a first reference image of the surroundings of the vehicle which is at one of the levels of the multi-level road system, and a second reference image of the surroundings of the vehicle which is at another one of the levels of the multi-level road system;
    the method further comprising, subsequent to step b) and prior to step d), the step of
    f) extracting, by the processing module, image data from the video data;
    wherein step d) includes generating the recognition result that indicates which level the vehicle is at by comparing images between the image data and the first reference image, and comparing images between the image data and the second reference image.

4. The method as claimed in claim 3, the vehicle equipment unit including a car video recorder and a mobile communication device, the car video recorder including the image capturing module, the positioning module and a first processor, the mobile communication device including a second processor, the first and second processors cooperatively serving as the processing module,
    wherein steps a) and b) are to be performed by the first processor, and steps c), d), e) and f) are to be performed by the second processor;
    the first processor transmits the image data to the second processor subsequent to step b); and the second processor transmits the recognition result to the first processor subsequent to step d).

5. The method as claimed in claim 3, the vehicle equipment unit including a car video recorder and a mobile communication device, the car video recorder including the image capturing module and a first processor, the mobile communication device including the positioning module and a second processor, the first and second processors cooperatively serving as the processing module;

wherein steps a), c), d), and f) are to be performed by the second processor;

when the second processor determines that the vehicle is in the predetermined area in step a), the second processor notifies the first processor to perform step b); and the first processor transmits the image data to the second processor subsequent to step b).

6. The method as claimed in claim 1, the vehicle equipment unit further including an output module, the method further comprising, subsequent to step d), the step of:

g) controlling, by the processing module, the output module to output predetermined driving assistance information that corresponds to the level which the vehicle is at according to the recognition result.

7. The method as claimed in claim 1, the multi-level road system including the elevated road on a higher level of the multi-level road system and the ground level road on a lower level thereof.

\* \* \* \* \*